United States Patent
Xie et al.

(10) Patent No.: US 9,680,386 B2
(45) Date of Patent: Jun. 13, 2017

(54) MINIMUM DUTY CYCLE CONTROL FOR ACTIVE SNUBBER

(71) Applicant: Analog Devices Global, Hamilton (BM)

(72) Inventors: Renjian Xie, Shenzhen (CN); Yingyang Ou, Shenzhen (CN)

(73) Assignee: Analog Devices Global, Hamilton (BM)

( * ) Notice: Subject to any disclaimer, the term of this patent is extended or adjusted under 35 U.S.C. 154(b) by 151 days.

(21) Appl. No.: 14/529,430

(22) Filed: Oct. 31, 2014

(65) Prior Publication Data
US 2016/0087541 A1    Mar. 24, 2016

Related U.S. Application Data

(63) Continuation of application No. PCT/CN2014/087177, filed on Sep. 23, 2014.

(51) Int. Cl.
*H02M 3/335* (2006.01)
*H02M 3/337* (2006.01)
*H02M 1/34* (2007.01)

(52) U.S. Cl.
CPC ..... *H02M 3/33592* (2013.01); *H02M 3/3376* (2013.01); *H02M 2001/342* (2013.01); *Y02B 70/1475* (2013.01); *Y02B 70/1491* (2013.01)

(58) Field of Classification Search
CPC ......... H02M 3/33546; H02M 3/33592; H02M 3/3376; H02M 2001/342; Y02B 70/1491; Y02B 70/1475
USPC ................... 363/21.06, 21.04–21.11
See application file for complete search history.

(56) References Cited

U.S. PATENT DOCUMENTS

| | | | | |
|---|---|---|---|---|
| 5,866,866 A | * | 2/1999 | Shimada | B23K 11/257 219/110 |
| 5,877,947 A | * | 3/1999 | Chen | H02M 1/34 363/124 |
| 6,128,206 A | * | 10/2000 | Sun | H02M 3/33592 363/127 |
| 6,246,592 B1 | * | 6/2001 | Balogh | H02M 3/33592 363/16 |
| 6,760,235 B2 | * | 7/2004 | Lin | H02M 1/36 363/21.06 |
| 6,771,521 B1 | * | 8/2004 | Xiong | H02M 1/34 363/21.06 |
| 6,882,548 B1 | * | 4/2005 | Jacobs | H02M 1/34 363/127 |

(Continued)

OTHER PUBLICATIONS

Search report from STIC EIC 2800 searcher John DiGeronimo.*

*Primary Examiner* — Timothy J Dole
*Assistant Examiner* — Htet Z Kyaw
(74) *Attorney, Agent, or Firm* — Schwegman Lundberg & Woessner, P.A.

(57) ABSTRACT

This application provides methods and apparatus for controlling aspects of a synchronous rectifier power converter. In an example, an apparatus can include a minimum duty cycle control circuit configured to receive first control signals for one or more switches associated with the synchronous rectifier power converter, to compare a duty cycle of the first control signals to a minimum duty cycle threshold, and to provide second control signals having at least the minimum duty cycle for an active snubber switch of the synchronous rectifier power converter.

20 Claims, 7 Drawing Sheets

(56) References Cited

U.S. PATENT DOCUMENTS

| | | | | |
|---|---|---|---|---|
| 6,980,447 | B1* | 12/2005 | Schaible | H02M 1/34 |
| | | | | 361/91.7 |
| 7,196,916 | B2* | 3/2007 | Batarseh | H02M 3/3376 |
| | | | | 323/235 |
| 7,589,982 | B2* | 9/2009 | Wang | H02M 3/33592 |
| | | | | 363/21.06 |
| 8,670,247 | B2* | 3/2014 | Mase | H02M 1/36 |
| | | | | 363/125 |
| 8,873,259 | B2* | 10/2014 | Fujiyoshi | H02M 1/34 |
| | | | | 363/21.06 |
| 9,030,848 | B2* | 5/2015 | Sato | H02M 3/33592 |
| | | | | 363/21.06 |
| 9,240,712 | B2* | 1/2016 | Chandrasekaran | H02M 1/4225 |
| 2009/0154204 | A1* | 6/2009 | Taylor | H02M 3/33592 |
| | | | | 363/52 |
| 2011/0194206 | A1* | 8/2011 | Sase | H02M 3/33592 |
| | | | | 360/75 |
| 2014/0126247 | A1* | 5/2014 | Koch | H02M 3/33507 |
| | | | | 363/21.14 |
| 2014/0268894 | A1* | 9/2014 | Shinohara | H02M 3/33592 |
| | | | | 363/17 |
| 2015/0200598 | A1* | 7/2015 | Kha | H02M 3/33523 |
| | | | | 363/17 |

* cited by examiner

MINIMUM DUTY CYCLE CONTROL FOR ACTIVE SNUBBER

CLAIM OF PRIORITY

This application is a continuation under 35 U.S.C. §111(a) and claims benefit of priority to International Patent Application Serial No. PCT/CN2014/087177, filed on Sep. 23, 2014, which is hereby incorporated by reference herein in its entirety.

BACKGROUND

Synchronous rectifiers have provided an elegant solution to applications that demand improved power density and efficiency from the power converter. Semiconductor switches such as Metal-Oxide-Semiconductor Field Effect Transistors (MOSFETs), Insulated Gate Bipolar Transistors (IGBTs) can be produced with tiny conduction resistance such that when they replace rectifier diodes significant efficiency improvements and reductions in heat dissipation can be realized.

However, the synchronous rectifiers also bring one problem—a large voltage spike and high frequency ringing across a synchronous rectifier's drain and source. The voltage spikes can be caused by the poor reverse recovery characteristics of the body diodes of the synchronous rectifiers. In some applications, severe voltage stress can be imposed on the synchronous rectifiers due to the voltage spikes. One approach can include using rectifiers with voltage ratings that are high enough to withstand a worst case scenario voltage spike to prevent the breakdown of the synchronous rectifiers. However, this type of approach to the high voltage spike issue generally includes using rectifiers having much higher conduction resistance than a nominally rated rectifier, resulting in an increase in conduction losses.

OVERVIEW

This application provides methods and apparatus for controlling aspects of a synchronous rectifier power converter. In an example, an apparatus can include a minimum duty cycle control circuit configured to receive first control signals for one or more switches associated with the synchronous rectifier power converter, to compare a duty cycle of the first control signals to a minimum duty cycle threshold, and to provide second control signals having at least the minimum duty cycle for an active snubber switch of the synchronous rectifier power converter.

This overview is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
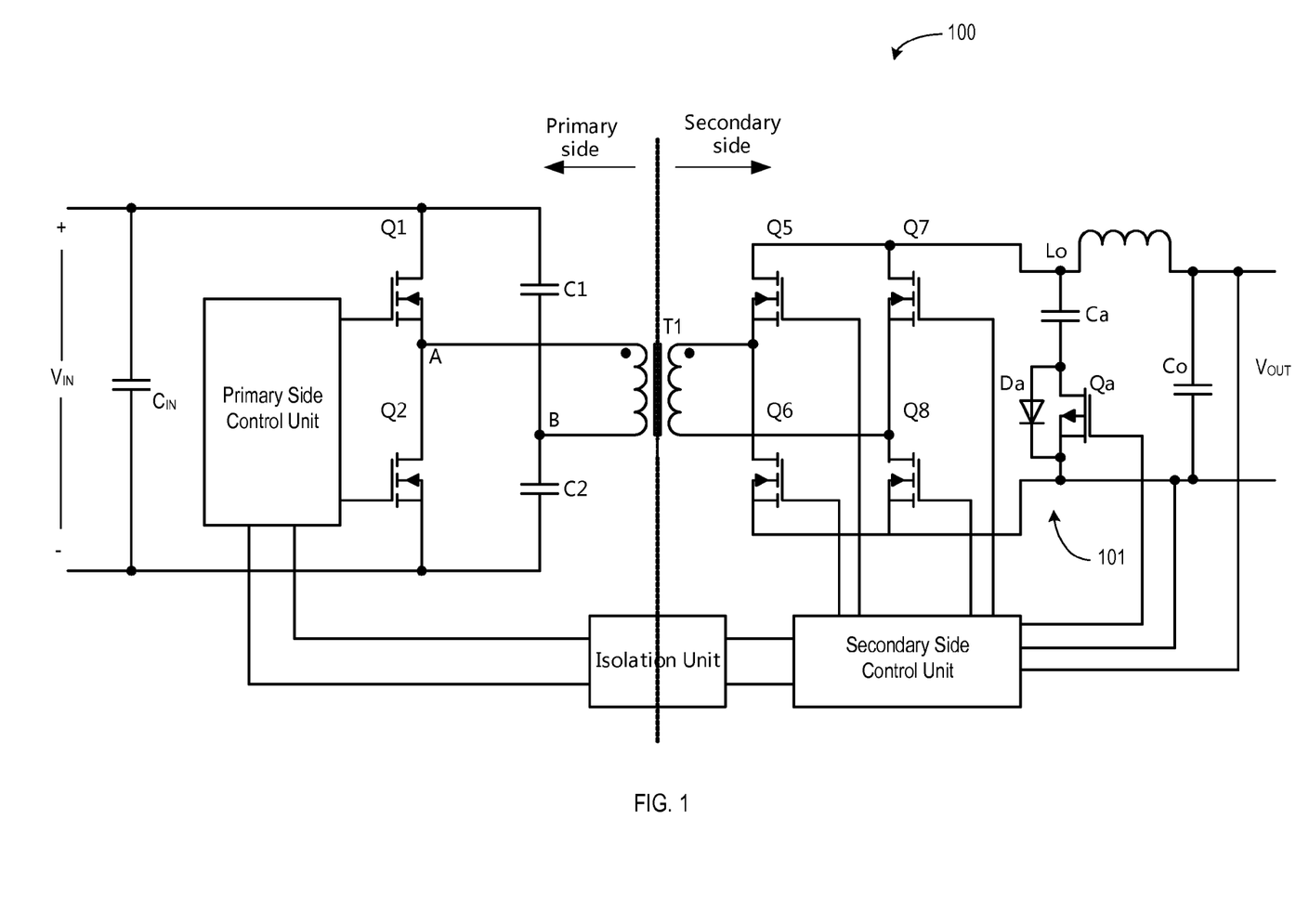
FIG. 1 illustrates an example power converter with an active snubber.

FIG. 1 illustrates an example synchronous rectifier power converter 100 with an active snubber 101. The power converter 100 is configured to receive an input voltage ($V_{IN}$) and provide an isolated output voltage ($V_{OUT}$) typically at a different voltage level. In addition to the switches discussed below, the power converter 100 can include one or more controllers and isolation circuitry to provide the isolated output voltage ($V_{OUT}$). In certain examples, the power converter can include a primary side controller, a secondary side controller and an isolation circuit. In some examples, one or more of the controllers and the isolation circuit can be combined is a single controller unit.

With regards to the operation of the synchronous rectifier power converter 100, in certain examples, when the switches on the primary side (Q1, Q2) are turned off, the synchronous rectifiers (Q5, Q6, Q7, Q8) or their body diodes can be conducting to give a path for the freewheeling current of the output inductor (Lo). As a primary switch (Q1, Q2) is turned on, the synchronous rectifiers (Q5, Q6, Q7, Q8) can be turned off. However, the body diodes of the synchronous rectifiers (Q5, Q6, Q7, Q8) can continue to conduct because of the continuity of the inductor current. After the primary side switch (Q1, Q2) turns on fully, the voltage across the secondary winding of the main transformer T1, applied reversely on the conducting body diodes of the synchronous rectifiers (Q5, Q6, Q7, Q8), can force the body diodes to be turned off According to the reverse recovery characteristic of a body diode, a large reverse current with large di/dt rate can appear in the body diodes. After the body diodes are turned off fully, the reverse current, as well as the energy stored in the leakage inductance of the secondary wind of the T1 and inductance of the ground path, needs a path to be transferred, otherwise, the reverse current can generate a large voltage spike and high frequency rings across the synchronous rectifiers (Q5, Q6, Q7, Q8). Contemporaneously with the body diodes ceasing to conduct, a switch (Qa) of an active snubber 101 can be turned on to give a path to this energy. The energy can be transferred to the large capacitor (Ca) of the active snubber 101 so that the voltage across the synchronous rectifiers cannot increase too much. In this manner, a voltage appearing on the rectifiers (Q5, Q6, Q7, Q8) is limited to avoid damaging or degrading the rectifiers.

Figure 2:
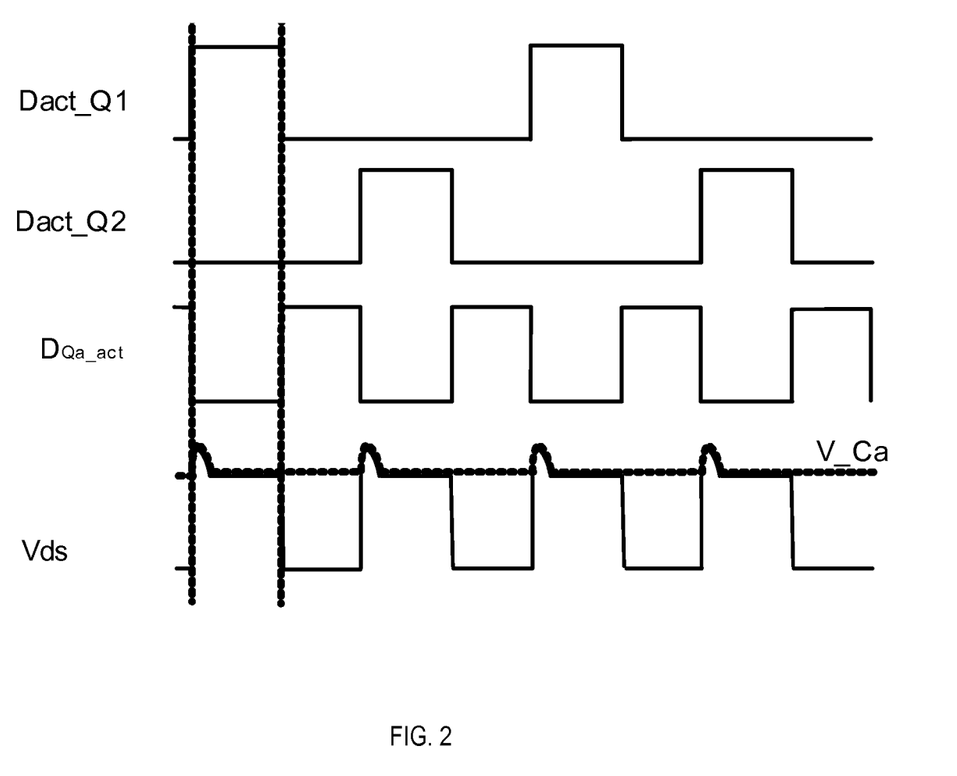
FIG. 2 illustrates generally a plot of two switching cycles of the power converter of FIG. 1.

A driving signal for the active switch (Qa) can be derived from a control unit, such as a primary side control unit or a secondary side control unit. In some examples, the active switch (Qa) can be turned on in-phase with the primary side switch (Q1,Q2), such that the active switch (Qa) is turned on when a primary side switch (Q1, Q2) is turned on or conducting. FIG. 2 illustrates generally a plot of two switching cycles that correspond to an operating mode of the power converter of FIG. 1. The plot includes the control signals (Dact_Q1, Dact_Q2) of the NMOS primary switches (Q1, Q2), the control signal ($D_{Qa\_act}$) of the PMOS active switch (Qa) of the snubber, the voltage (Vds) that can appear across the drain and source of a rectifier (Q5, Q6, Q7, Q8) and the voltage (V_Ca) across the active capacitor.

Referring to FIG. 2, when a primary side NMOS switch (Q1, Q2) is turned on, the control signal at high logic level, the PMOS active switch (Qa), or snubber switch, is also turned on, low logic level, so that the active capacitor (Ca) can be in parallel with the synchronous rectifiers (Q5, Q6, Q7, Q8) to store the energy caused by the reverse recovery of the body diodes and discharge this energy to the secondary wind and output after the spike disappears. The reverse voltage plot (Vds) illustrates that when the active switch (Qa) is conducting, the voltage (Vds) across the drain and source of the synchronous rectifiers (Q5, Q6, Q7, Q8) can equal the voltage across the active capacitor (Ca). This voltage increases in a certain range with low slew rate to store the reverse recovery energy of the diodes and discharges it back to the main power train, resulting in the voltage returning to the original value before a primary side switch (Q1, Q2) is turned on in the next half cycle. In certain examples, the snubber switch can include a transistor, such as but not limited to, a Metal-Oxide-Semiconductor Field Effect Transistor (MOSFET) or Insulated Gate Bipolar Transistor (IGBT). Use of the phrase "Metal-Oxide-Semiconductor" does not imply that all examples must include a device having a metallic gate structure. For example, a FET or other transistor structure can include a conductive gate material such as polysilicon.

Figure 3:
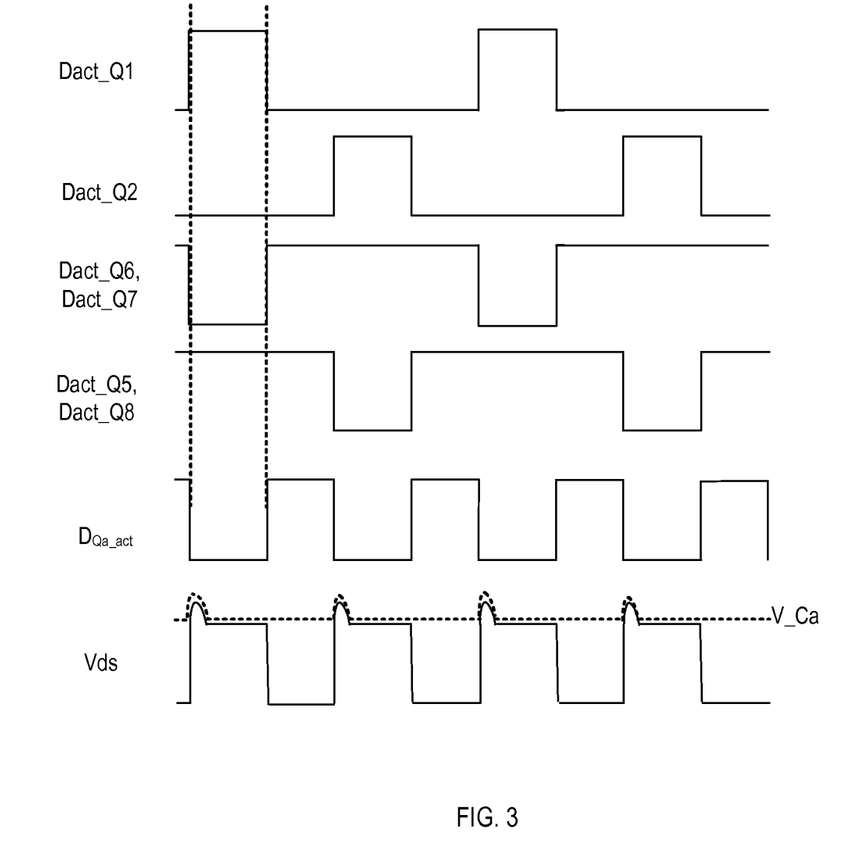
FIG. 3 illustrates an example timing diagram where a control signal of the active switch of an active snubber is derived from the control signals of the synchronous rectifiers.

In some examples, the active switch (Qa) control signal can be derived from the one or more of the control signals of the synchronous rectifiers. FIG. 3 illustrates an example timing diagram where a control signal ($D_{Qa\_act}$) of the active switch of an active snubber is derived from the control signals (Dact_Q5, Dact_Q6, Dact_Q7, Dact_Q8) of the synchronous rectifiers (Q5, Q6, Q7, Q8). Control-wise, the synchronous rectifiers (Q5, Q6, Q7, Q8) can be complimentary with the primary side switches (Q1, Q2) and the control signal ($D_{Qa\_act}$) for the active switch (Qa) of the active snubber can be the output of an "AND" function of the control signals (Dact_Q5, Dact_Q6, Dact_Q7, Dact_Q8) for the synchronous rectifiers (Q5, Q6, Q7, Q8). With respect to the voltage (Vds) across the synchronous rectifiers, the control scheme of FIG. 3 works essentially the same as the control scheme of FIG. 2, in that in both schemes, during normal steady state operation, the control schemes clamp the stress inducing voltage across the synchronous rectifiers.

Figure 4:
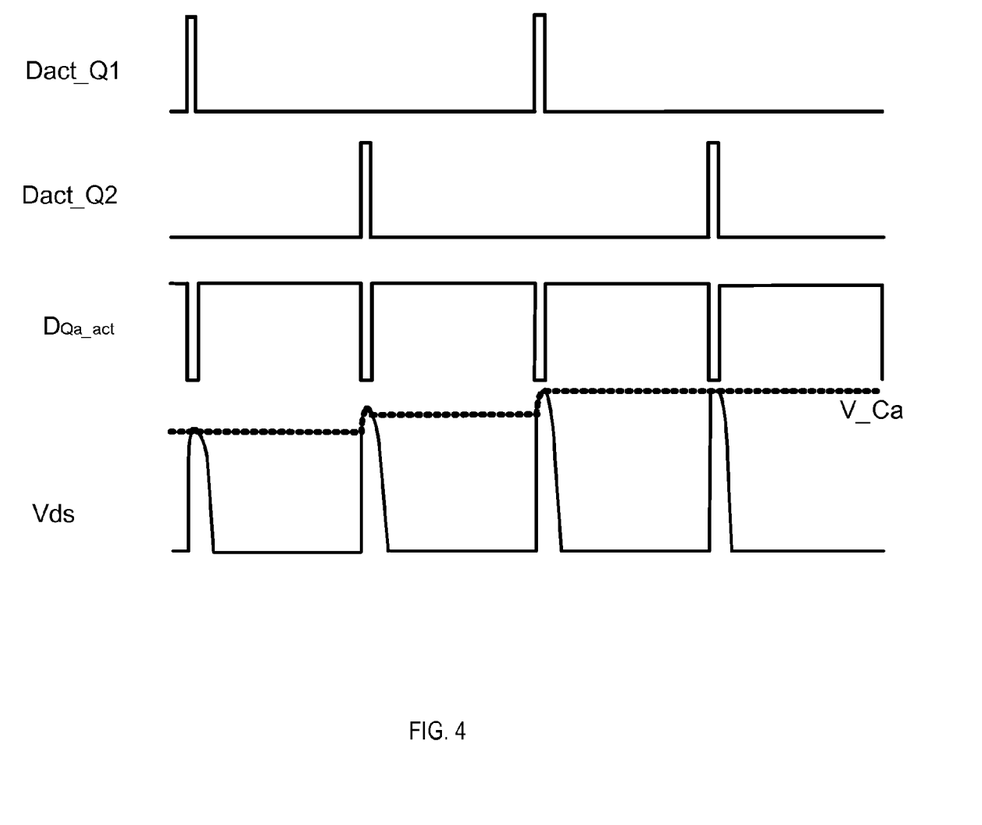
FIG. 4 illustrates generally a timing diagram of the control schemes of FIGS. 2 and 3 during a soft-start interval.

Power converters can provide a soft-start function where the primary side switches will conduct according to a duty cycle that increases from cycle to cycle, such as from an initial duty cycle of about zero. Soft-start can limit the start-up in-rush current from the primary side of the converter to the secondary side of the converter which can be significantly more efficient in certain applications. FIG. 4 illustrates generally a timing diagram of the control schemes of FIGS. 2 and 3 such as representing a portion of a soft-start control sequence. During the soft-start process, the duty cycle of the primary side switches (Q1, Q2) can be very small, such that the active capacitor (Ca) can only be charged by the voltage spike and there is not enough time for the active switch (Qa) to discharge the energy stored in the active capacitor (Ca) to the secondary winding of the transformer T1 and the output via the active snubber branch. Therefore, the voltage across the active capacitor (Ca) can keep increasing. After several cycles at the beginning of the soft-start process, the voltage across the active capacitor (Ca) can increase during successive cycles as shown illustratively in FIG. 4. Such increase can reach a level where the so that the active snubber can fail and the voltage across the synchronous rectifiers can then be unclamped. In such a failure scenario, the voltage across the synchronous rectifiers may exceed the voltage rating of the synchronous rectifiers resulting in the breakdown of these devices.

In some control schemes, including control schemes that include soft start, a cycle-by-cycle limit can be imposed that further limits the active snubber switch on-time. The cycle-by-cycle limit is usually used to limit current flowing in the power train of a power supply or the output voltage at the output terminals. It can terminate specified driving signals to limit on-time of the primary switches so that the power delivery can be stopped. The cycle-by-cycle limit can terminate the driving signals at any time once a sensed signal exceeds a threshold. Therefore, the duty cycle of the driving signals for the primary side switches can also be further limited to a very small value during the soft-start.

The present inventors have recognized that if the active switch of the snubber branch can be maintained in a conducting state for a specified interval (e.g., a minimum interval), the soft-start induced energy or the cycle-by-cycle limit induced energy, on the active capacitor can be discharged to the secondary winding of the transformer T1 or the output of the power converter and prevent over stressing the snubber circuit and the synchronous rectifiers.

Figure 5:
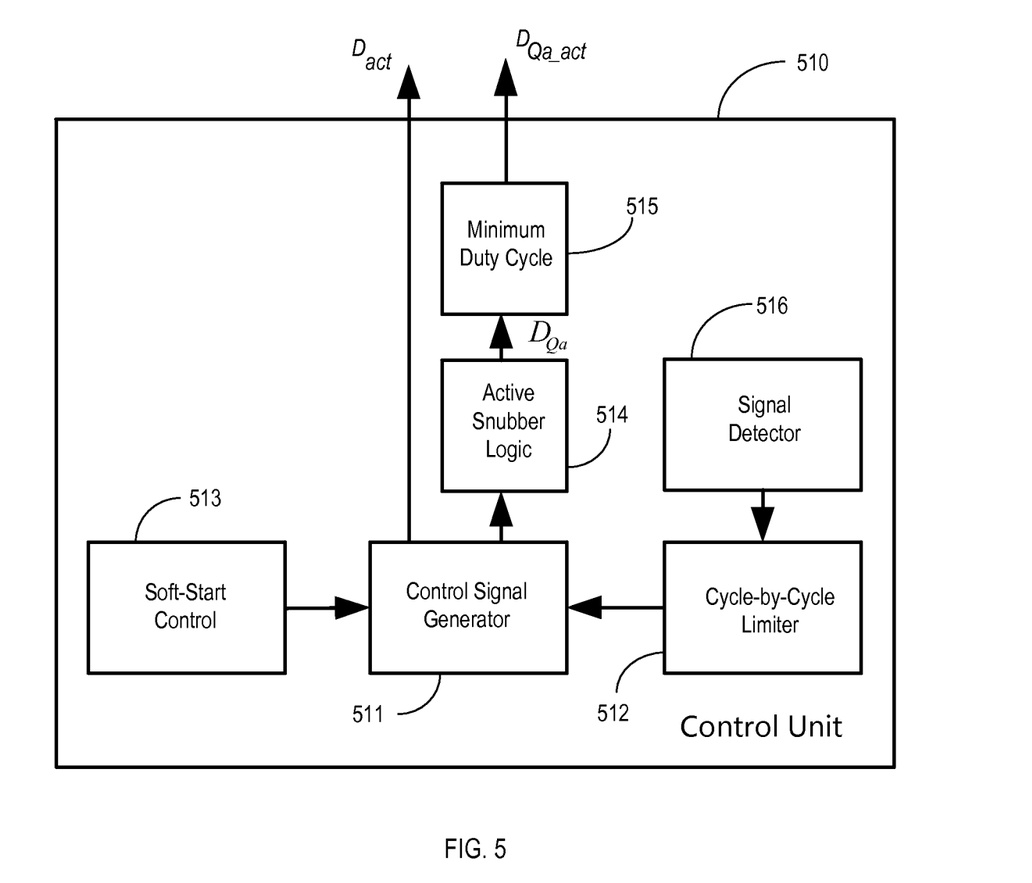
FIG. 5 illustrates generally a block diagram of an example power converter controller.

FIG. 5 illustrates generally a block diagram of an example power converter controller 510. In some examples, the controller can include a control signal generator 511, a cycle-by-cycle limiter circuit 512, a soft-start control circuit 513, active snubber logic 514, and a minimum snubber duty cycle circuit 515. The control signal generator 511 can provide the control information ($D_{act}$) for the primary switches and the synchronous rectifiers to convert the input power to output power having the desired voltage. The soft-start control circuit 513 can limit the duty cycle of the primary switches when the output voltage changes from one level to another level such as, but not limited to, when the power converter is enabled and the output voltage is near zero. Such soft start limiting can limit in-rush current of the converter in certain examples. The cycle-by-cycle limiter 512 circuit can limit duty cycle to, for example, limit current to the load, or limit output voltage. In certain examples, the controller can include a signal detector circuit 516 to monitor and measure one or more characteristics of the converter. The active snubber logic 514 can provide the snubber control information ($D_{Qa}$) to the active snubber switch. As discussed above, when the duty cycle of the primary side switches is reduced, so is the conduction time of the active snubber switch and circuit according to the control schemes discussed above. The shortened conduction time can result in potentially destructive voltage across the active capacitor and synchronous rectifiers. In certain examples, the minimum snubber duty-cycle circuit 516 can receive the snubber control information ($D_{Qa}$) from the active snubber logic 514 and can ensure that the snubber control information includes ($D_{Qa}$) a minimum duty cycle or on-time for each conduction period.

Figure 6:
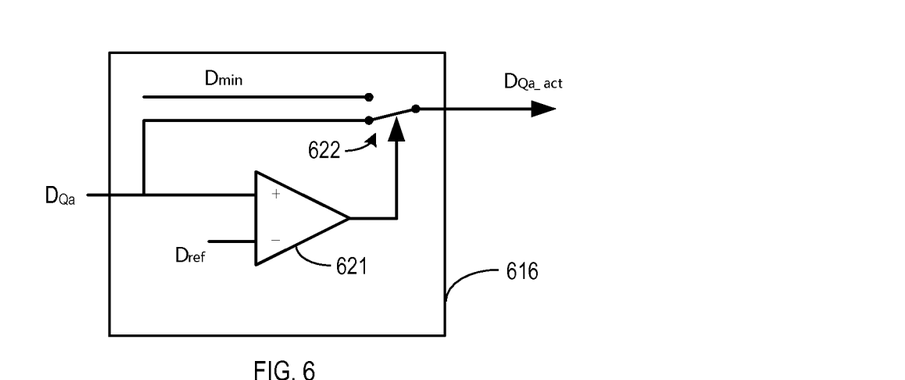
FIG. 6 through FIG. 8 illustrate generally examples of minimum snubber duty-cycle circuits.

FIG. 6 illustrates generally an example of a minimum snubber duty-cycle circuit 616. The circuit 616 can receive switch control information ($D_{Qa}$) for either the primary switches or, in some examples, the rectifier switches. The circuit 616 can include a comparator 621 to compare the duty cycle of the received switch control information ($D_{Qa}$)

to a threshold duty cycle or reference duty cycle ($D_{ref}$). In certain examples, an output of the comparator 621 can trigger a switch 622 such that an output signal ($D_{Qa\_act}$) of the minimum snubber duty-cycle circuit 616 includes the received control information ($D_{Qa}$) or snubber control information including a minimum duty cycle or on-time for the snubber switch.

Figure 7:
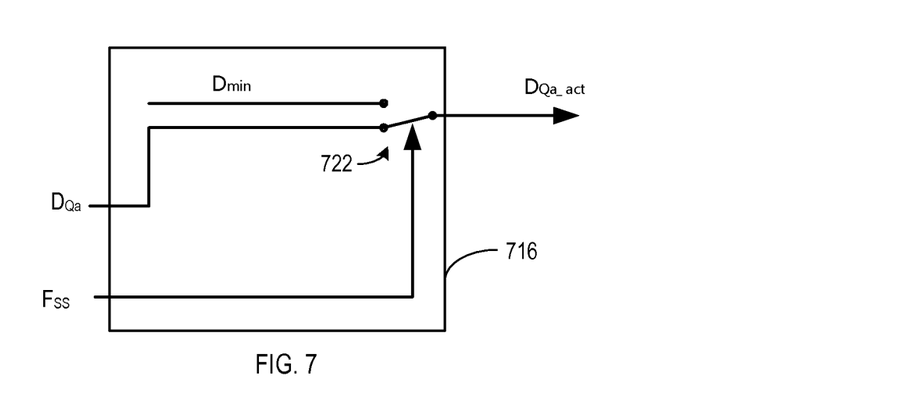

FIG. 7 illustrates generally an example of a minimum snubber duty-cycle circuit 716. The circuit 716 can receive switch control information ($D_{Qa}$) for either the primary switches or, in some examples, the rectifier switches and can provide an output signal ($D_{Qa\_act}$) including snubber control information. In certain examples, the circuit can receive limit information ($F_{SS}$) from a soft-start circuit or a cycle-by-cycle circuit, for example, to indicate when the respective circuit is limiting conduction time of the primary switches. In certain examples, the minimum snubber duty-cycle circuit 716 can include a switch 722 responsive to the limit information ($F_{SS}$) and can pass the switch control information ($D_{Qa}$) or a representation thereof as the output signal ($D_{Qa\_act}$) when the limit information is in a first state or range, and can pass switch control information including a minimum duty cycle or on-time to the output ($D_{Qa\_act}$) when the limit information is in a second range or second state.

Figure 8:
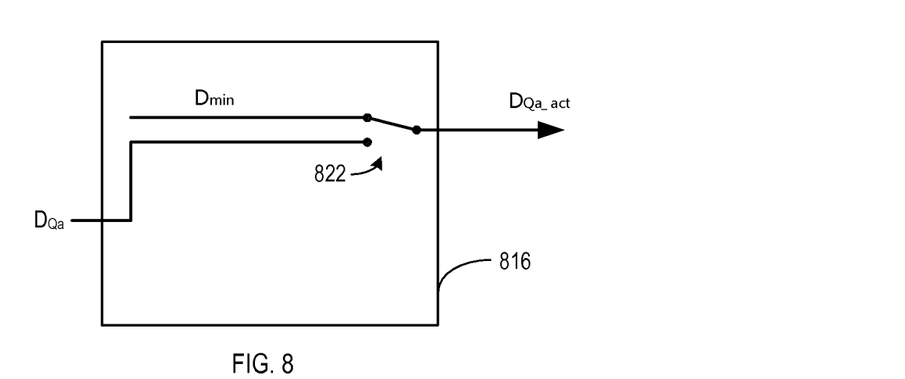

FIG. 8 illustrates general an example of a minimum snubber duty-cycle circuit 816. The circuit 816 can receive switch first control information ($D_{Qa}$) for either the primary switches or, in some examples, the rectifier switches, or a representation thereof. The circuit 816 can provide minimum snubber switch control information including a minimum duty cycle or on-time. In certain examples, the circuit 816 can include a switch 822 to provide as an output signal ($D_{Qa\_act}$) either the received control information ($D_{Qa}$) or the minimum snubber switch control information ($D_{min}$) to the snubber switch. In some examples, the switch 822 can be preprogrammed. In some examples, a user of the power converter can select a state of the switch 822.

Figure 9:
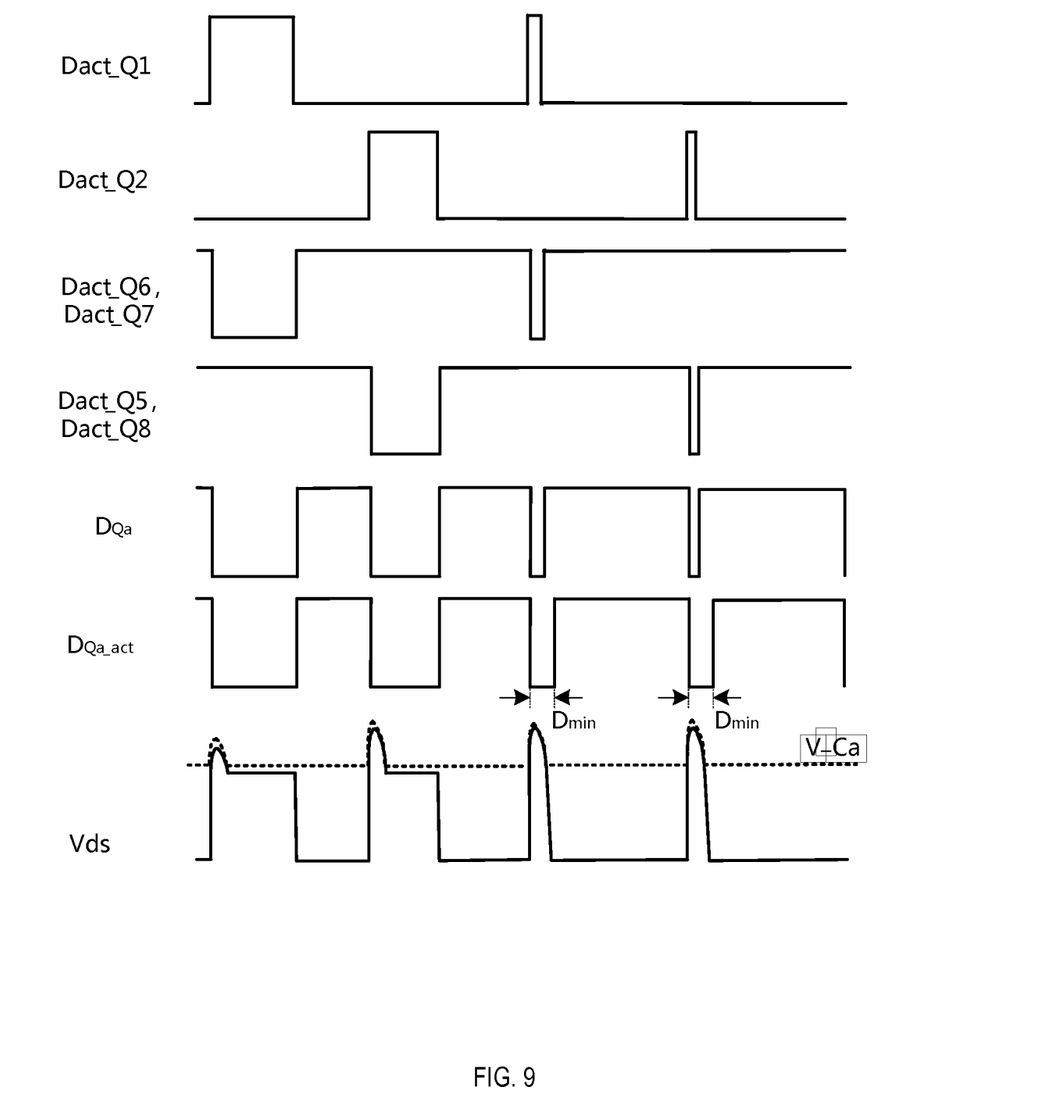
FIG. 9 illustrates generally a timing diagram illustrating the effects of an example minimum snubber duty cycle circuit.

FIG. 9 illustrates generally a timing diagram where a minimum snubber duty cycle circuit modifies traditional snubber control information to provide a minimum snubber conduction time when, for example, a sub-circuit of the power converter controller would otherwise limit the conduction time of the snubber circuit. The plot illustrates the control signals for the example NMOS primary switches (Q1, Q2) and NMOS rectifier switches (Q5, Q6, Q7, Q8). The plot shows a typical control signal ($D_{Qa}$) for a snubber switch and a snubber control signal ($D_{Qa\_act}$) process by an example minimum snubber duty cycle circuit. Compared to FIG. 4 the voltage (Vds) across the rectifier switches and the snubber circuit is not allowed to become excessive using the snubber control information provided by the example minimum snubber duty cycle circuit.

VARIOUS NOTES & EXAMPLES

In Example 1, an apparatus for a synchronous rectifier power converter can include a minimum duty cycle control circuit configured to receive first control signals for one or more switches associated with the synchronous rectifier power converter, to compare a duty cycle of the first control signals to a minimum duty cycle threshold, and to provide second control signals having at least the minimum duty cycle for an active snubber switch of the synchronous rectifier power converter.

In Example 2, the apparatus of Example 1 optionally includes a control signal generator configured to provide the first control signals.

In Example 3, the control signal generator of any one or more of Examples 1-2 optionally is configured to provide the first control signals to couple to one or more primary side transistors of the synchronous rectifier power converter.

In Example 4, the control signal generator of any one or more of Examples 1-3 optionally is configured to provide the first control signals to couple to one or more secondary side rectifier transistors of the synchronous rectifier power converter.

In Example 5, the apparatus of any one or more of Examples 1-4 optionally includes a soft-start circuit configured to limit a duty cycle of the first control signals during a transition of an output voltage of the synchronous rectifier power converter from a first level to a second level, the second level having a higher voltage than the first level.

In Example 6, the apparatus of any one or more of Examples 1-5 optionally includes a cycle-by-cycle limiter configured to limit the duty cycle of the first control signals when a characteristic of the synchronous rectifier power converter exceeds a threshold.

In Example 7, the characteristic of any one or more of Examples 1-6 optionally includes a current measurement of the synchronous rectifier power converter.

In Example 8, the characteristic of any one or more of Examples 1-7 optionally includes a voltage measurement of the synchronous rectifier power converter.

In Example 9, a method of controlling an active snubber of a synchronous rectifier power converter can include receiving first control signals for one or more switches associated with a synchronous rectifier power converter at a minimum duty cycle control circuit, comparing a duty cycle of the first control signals to a minimum duty cycle threshold, and providing second control signals having at least the minimum duty cycle for an active snubber switch of the synchronous rectifier power converter if the duty cycle of the first control signals is less than the minimum duty cycle.

In Example 10, the method of any one or more of Examples 1-9 optionally includes providing the first control signals using a control signal generator of the synchronous rectifier power converter.

In Example 11, the providing the first control signals of any one or more of Examples 1-10 optionally includes providing the first control signals to primary side transistors of the synchronous rectifier power converter.

In example 12, the providing the first control signals of any one or more of Examples 1-11 optionally includes providing the first control signals to secondary side rectifiers of the synchronous rectifier power converter.

In Example 13, the method of any one or more of Examples 1-12 optionally includes limiting a duty cycle of the first control signals during a transition of an output voltage of the synchronous rectifier power converter from a first level to a second level, the second level having a higher voltage than the first level using a soft-start circuit of the synchronous rectifier power converter.

In Example 14, the method of any one or more of Examples 1-13 optionally includes limiting the duty cycle of the first control signals using a cycle-by-cycle limiter when a characteristic of the synchronous rectifier power converter exceeds a threshold.

In Example 15, the characteristic of any one or more of Examples 1-14 optionally includes a current measurement of the synchronous rectifier power converter.

In Example 16, the characteristic of any one or more of Examples 1-15 optionally includes a voltage measurement of the synchronous rectifier power converter.

In Example 17, a synchronous rectifier power converter can include a transformer having a primary winding and a secondary winding, a primary switch coupled to the primary winding and configured to couple to an input power source, a rectifier switch coupled to the secondary winding and configured to couple to a load, an active snubber circuit coupled across the rectifier switch, and a controller configured to provide first control information to the primary switch, second control information to the rectifier switch, and third control information to the active snubber circuit. In an example, the controller can include a minimum duty cycle control circuit configured to receive at least one control information of the first control information or the second control information, to compare a duty cycle of the at least one control information to a minimum duty cycle threshold, and to provide the third control information having at least a minimum duty cycle.

In Example 18, the active snubber of any one or more of Examples 1-17 optionally includes an active snubber transistor configured to receive the third control information.

In Example 19, the active snubber of any one or more of Examples 1-18 optionally includes and a snubber capacitor coupled in series with the active snubber transistor.

In Example 20, the minimum duty cycle control circuit of any one or more of Examples 1-19 optionally is configured to receive the second control information, to compare a duty cycle of the second control information to a minimum duty cycle threshold, and to provide the third control information having at least a minimum duty cycle if the duty cycle of the second control information is less than the minimum duty cycle threshold.

Example 21 can include, or can optionally be combined with any portion or combination of any portions of any one or more of Examples 1 through 20 to include, subject matter that can include means for performing any one or more of the functions of Examples 1 through 20, or a machine-readable medium including instructions that, when performed by a machine, cause the machine to perform any one or more of the functions of Examples 1 through 20.

Each of these non-limiting examples can stand on its own, or can be combined in various permutations or combinations with one or more of the other examples.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The claimed invention is:

1. An apparatus for a synchronous rectifier power converter, the apparatus comprising:
a minimum duty cycle control circuit configured to receive first control signals for one or more switches associated with the synchronous rectifier power converter, to compare a duty cycle of the first control signals to a minimum duty cycle threshold, and to provide second control signals having at least the minimum duty cycle for an active snubber switch of the synchronous rectifier power converter.

2. The apparatus of claim 1 including a control signal generator configured to provide the first control signals.

3. The apparatus of claim 2, wherein the control signal generator is configured to provide the first control signals to couple to one or more primary side transistors of the synchronous rectifier power converter.

4. The apparatus of claim 2, wherein the control signal generator is configured to provide the first control signals to couple to one or more secondary side rectifier transistors of the synchronous rectifier power converter.

5. The apparatus of claim 2, including a soft-start circuit configured to limit a duty cycle of the first control signals during a transition of an output voltage of the synchronous rectifier power converter from a first level to a second level, the second level having a higher voltage than the first level.

6. The apparatus of claim 2, including a cycle-by-cycle limiter configured to limit the duty cycle of the first control signals when a characteristic of the synchronous rectifier power converter exceeds a threshold.

7. The apparatus of claim 6, wherein the characteristic includes a current measurement of the synchronous rectifier power converter.

8. The apparatus of claim 6, wherein the characteristic includes a voltage measurement of the synchronous rectifier power converter.

9. A method of controlling an active snubber of a synchronous rectifier power converter, the method comprising:
receiving first control signals for one or more switches associated with a synchronous rectifier power converter at a minimum duty cycle control circuit; and
comparing a duty cycle of the first control signals to a minimum duty cycle threshold; and
providing second control signals having at least the minimum duty cycle for an active snubber switch of the synchronous rectifier power converter if the duty cycle of the first control signals is less than the minimum duty cycle.

10. The method of claim 9, including providing the first control signals using a control signal generator of the synchronous rectifier power converter.

11. The method of claim 9, wherein the providing the first control signals includes providing the first control signals to primary side transistors of the synchronous rectifier power converter.

12. The method of claim 9, wherein the providing the first control signals includes providing the first control signals to secondary side rectifiers of the synchronous rectifier power converter.

13. The method of claim 10, including limiting a duty cycle of the first control signals during a transition of an output voltage of the synchronous rectifier power converter from a first level to a second level, the second level having a higher voltage than the first level using a soft-start circuit of the synchronous rectifier power converter.

14. The method of claim 10, including limiting the duty cycle of the first control signals using a cycle-by-cycle limiter when a characteristic of the synchronous rectifier power converter exceeds a threshold.

15. The method of claim 10, wherein the characteristic includes a current measurement of the synchronous rectifier power converter.

16. The method of claim 10, wherein the characteristic includes a voltage measurement of the synchronous rectifier power converter.

17. A synchronous rectifier power converter comprising:
a transformer having a primary winding and a secondary winding:
a primary switch coupled to the primary winding and configured to couple to an input power source;
a rectifier switch coupled to the secondary winding and configured to couple to a load;
an active snubber circuit coupled across the rectifier switch; and
a controller configured to provide first control information to the primary switch, second control information to the rectifier switch, and third control information to the active snubber circuit, the controller including:
a minimum duty cycle control circuit configured to receive at least one control information of the first control information or the second control information, to compare a duty cycle of the at least one control information to a minimum duty cycle threshold, and to provide the third control information having at least a minimum duty cycle.

18. The synchronous rectifier power converter of claim 17, wherein the active snubber includes an active snubber transistor configured to receive the third control information.

19. The synchronous rectifier power converter of claim 18, wherein the active snubber includes and a snubber capacitor coupled in series with the active snubber transistor.

20. The synchronous rectifier power converter of claim 17, wherein the minimum duty cycle control circuit is configured to receive the second control information, to compare a duty cycle of the second control information to a minimum duty cycle threshold, and to provide the third control information having at least a minimum duty cycle if the duty cycle of the second control information is less than the minimum duty cycle threshold.

\* \* \* \* \*